(12) United States Patent
Grötsch

(10) Patent No.: US 7,976,200 B2
(45) Date of Patent: Jul. 12, 2011

(54) OPTICAL PROJECTION DEVICE

(75) Inventor: Stefan Grötsch, Bad Abbach (DE)

(73) Assignee: Osram Opto Semiconductors GmbH, Regensburg (DE)

( * ) Notice: Subject to any disclaimer, the term of this patent is extended or adjusted under 35 U.S.C. 154(b) by 211 days.

(21) Appl. No.: 12/279,873

(22) PCT Filed: Mar. 9, 2007

(86) PCT No.: PCT/DE2007/000432
§ 371 (c)(1),
(2), (4) Date: Nov. 25, 2008

(87) PCT Pub. No.: WO2007/110029
PCT Pub. Date: Oct. 4, 2007

(65) Prior Publication Data
US 2009/0154155 A1 Jun. 18, 2009

(30) Foreign Application Priority Data

Mar. 17, 2006 (DE) .......................... 10 2006 012 448
Jul. 5, 2006 (DE) .......................... 10 2006 031 076

(51) Int. Cl.
*F21V 3/00* (2006.01)

(52) U.S. Cl. ................... 362/311.02; 362/231; 362/235; 362/249.02; 362/317

(58) Field of Classification Search .................. 362/231, 362/235, 237, 249.02, 311.01–311.02, 317
See application file for complete search history.

(56) References Cited

U.S. PATENT DOCUMENTS

| | | | |
|---|---|---|---|
| 6,111,272 A | 8/2000 | Heinen | |
| 6,224,216 B1 | 5/2001 | Parker et al. | |
| 6,717,857 B2 | 4/2004 | Byeon et al. | |
| 6,995,030 B2 | 2/2006 | Illek et al. | |
| 7,059,726 B2 * | 6/2006 | Engle | 353/81 |
| 7,109,527 B2 | 9/2006 | Illek et al. | |
| 7,200,044 B2 | 4/2007 | Won et al. | |
| 2002/0017562 A1 | 2/2002 | Sadler et al. | |
| 2004/0206971 A1 | 10/2004 | Erchak et al. | |
| 2005/0173719 A1 | 8/2005 | Yonekubo et al. | |
| 2005/0179041 A1 * | 8/2005 | Harbers et al. | 257/80 |
| 2006/0145164 A1 | 7/2006 | Illek et al. | |

(Continued)

FOREIGN PATENT DOCUMENTS

CN 1582406 2/2005
(Continued)

OTHER PUBLICATIONS

Hans Zou et al., "58.1: Single-Panel LCOS Color Projector with LED Light Sources", *SID 05 Digest*, pp. 1698-1701 (2005).

(Continued)

*Primary Examiner* — Stephen F Husar
*Assistant Examiner* — Meghan K Dunwiddie
(74) *Attorney, Agent, or Firm* — Fish & Richardson P.C.

(57) ABSTRACT

The invention relates to an optical projection device. Said optical projection device comprises a plurality of light-emitting diode chips and at least one optical element comprising a light input surface which is associated with at least one of the light-emitting diode chips. The light decoupling surface of the light-emitting diode chip, which is adapted to the refraction index, is optically connected to the light input surface of the associated optical element.

19 Claims, 3 Drawing Sheets

U.S. PATENT DOCUMENTS

2006/0180820 A1    8/2006    Illek et al.

FOREIGN PATENT DOCUMENTS

| CN | 1736111 | 2/2006 |
|----|---------|--------|
| CN | 1870176 | 11/2006 |
| DE | 10 2005 031 336 | 11/2006 |
| EP | 0 905 797 | 3/1999 |
| EP | 1 037 173 | 9/2000 |
| EP | 1 418 765 | 5/2004 |
| EP | 1 566 847 | 8/2005 |
| WO | WO 02/13281 | 2/2002 |
| WO | WO 03/023490 | 3/2003 |
| WO | WO 2004/043076 | 5/2004 |
| WO | WO 2005/034523 | 4/2005 |
| WO | WO 2006/033030 | 3/2006 |

OTHER PUBLICATIONS

Notification of Transmittal of Translation of the International Preliminary Report on Patentability issued on Nov. 13, 2008 for corresponding International Application No. PCT/DE2007/000432.

"English Translation of Notification for the Opinion of Examination", Taiwan Patent Application No. 96108892, mailing date Oct. 27, 2010 (3 pages).

* cited by examiner

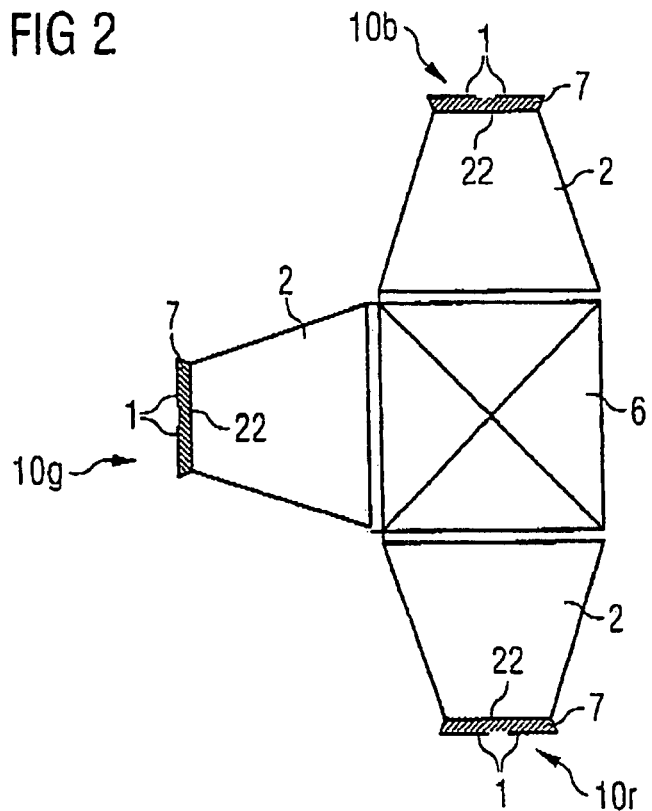
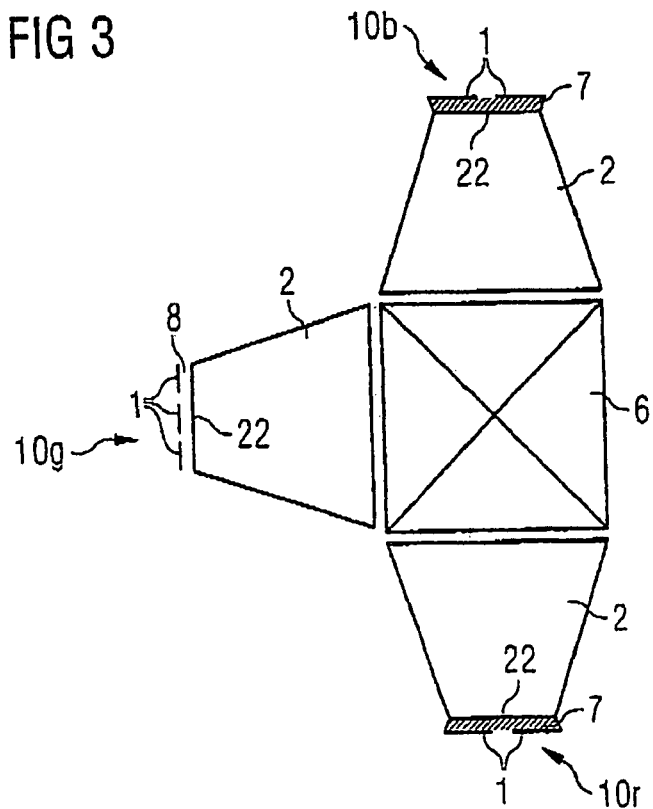

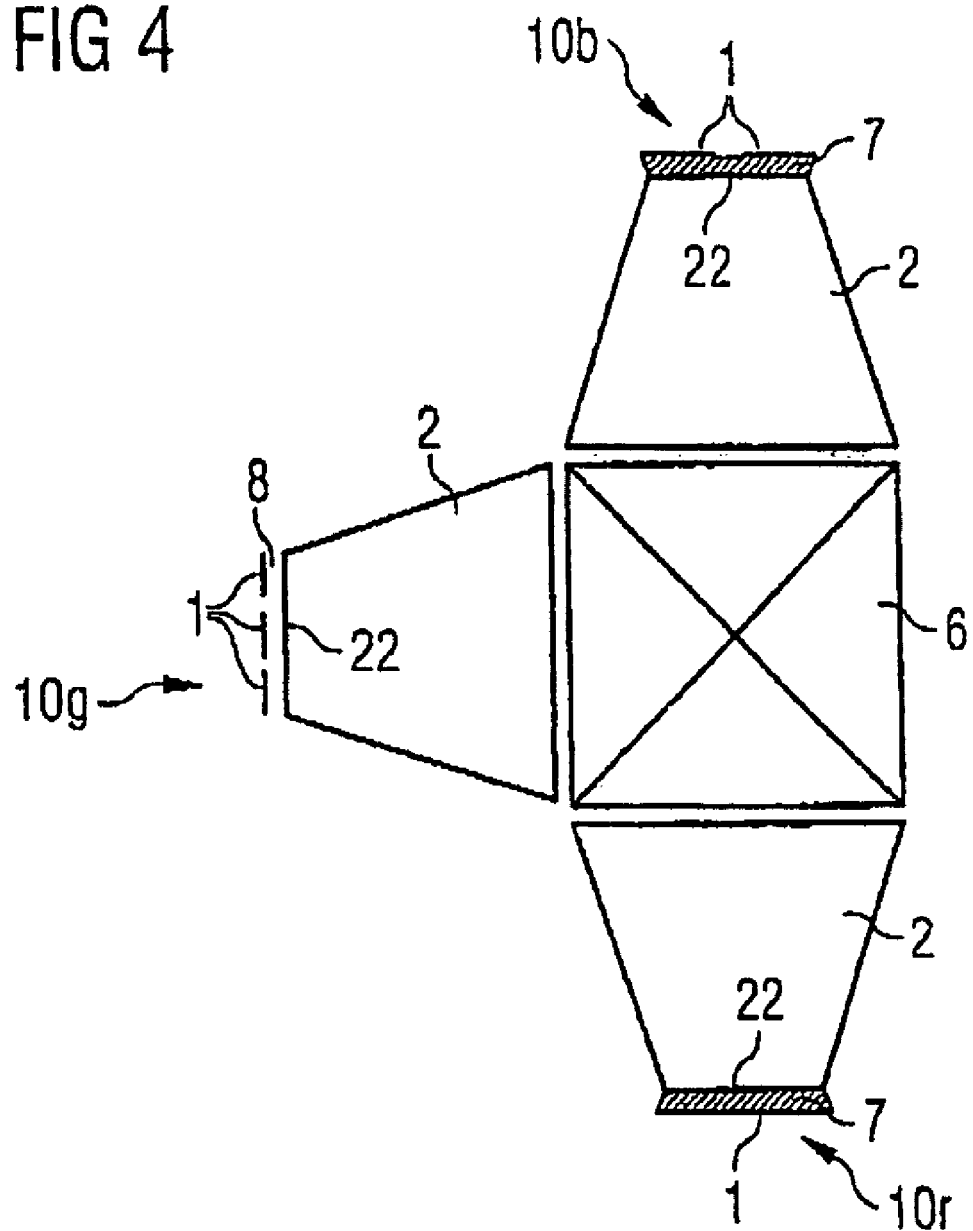

OPTICAL PROJECTION DEVICE

CROSS-REFERENCE TO RELATED APPLICATIONS

This application is the National Stage of International Application No. PCT/DE2007/000432, filed on Mar. 9, 2007, which claims the priority to German Patent Applications Serial No. 102006012448.0, filed on Mar. 17, 2006 and Serial No. 102006031076.4, filed on Jul. 5, 2006. The contents of these applications are hereby incorporated by reference in their entireties.

TECHNICAL FIELD

The invention relates to an optical projection device. Said optical projection device is, for example, suitable for the display of image information on a projection surface—such as a projection screen.

SUMMARY

An object of the disclosure is to describe a projection device which can be produced at particularly low cost.

According to at least one embodiment of the optical projection device, the optical projection device comprises a plurality of light-emitting diode chips. The light-emitting diode chips comprise the light sources of the projection device. That is to say that the light-emitting diode chips generate the light by means of which image information is projected by the optical projection device onto a projection surface.

According to at least one embodiment, the optical projection device comprises at least one optical element, which is associated with at least one light-emitting diode chip. That is to say that the optical element is subordinate to the light-emitting diode chip in a main direction of radiation from the light-emitting diode chip. In other words, the optical element is arranged such that at least part—preferably a large part—of the electromagnetic radiation emitted by the light-emitting diode chip enters the optical element through a light input surface of the same. The optical element is preferably associated with a plurality of light-emitting diode chips—at least two, for example—in the manner described. It is particularly preferred that the optical projection device comprise several such optical elements, each optical element being associated with at least one light-emitting diode chip. The optical element is preferably formed as a solid body. That means, for example, that the optical element is made of a transparent material and free of cavities.

According to at least one embodiment of the optical projection device, the light decoupling surface of at least one of the light-emitting diode chips, adapted to the refraction index, of the projection device is optically connected with the light input surface of the associated optical element. Light decoupling surface refers to the surface through which a major portion of the electromagnetic radiation generated in the light-emitting diode chip leaves the light-emitting diode chip. The light decoupling surface can refer, for example, to part of the external surface of the semiconductor body of the light-emitting diode chip.

Adapted to the refraction index means, for example, that a gap between light decoupling surface of the light-emitting diode chip and light input surface of the associated optical element is filled in with a material whose refraction index is greater than one. That means, for example, that there is no air gap between the light decoupling surface of the light-emitting diode chip and the light input surface of the associated optical element. In other words, the change in refraction index going from the material into the optical element is less than the change in refraction index would be going from air into the optical element.

According to at least one embodiment of the optical projection device, the optical projection device exhibits a plurality of light-emitting diode chips. Furthermore, the optical projection device exhibits at least one optical element with a light input surface. The optical element is associated with at least one light-emitting diode chip, the light decoupling surface of the light-emitting diode chip, adapted to the refraction index, being optically connected with the light input surface of the associated optical element.

According to at least one embodiment of the optical projection device, the gap between the light decoupling surface of at least one light-emitting diode chip and the light input surface of the associated optical element is filled with at least one material whose refraction index is at least 1.3. The refraction index of the material is preferably at least 1.4, and is particularly preferred to be at least 1.5. The material can be an index-matching gel, a coupling gel or an optical adhesive, for example. The material can wet the light decoupling surface of the light-emitting diode chip and the light input surface of the optical element and connect these two surfaces with one another. However, it is also possible for the light-emitting diode chip to be provided with a thin layer of a sealing material, which can contain silicone and/or epoxy resin, for example. In this case, the thin seal and the light input surface of the optical element are wetted with the material, which is adapted to the refraction index. It is further possible that the light input surface of the optical element is wetted before the complete hardening of a sealing material with which the light decoupling surface of the light-emitting diode chip is wetted, into which still-soft sealing material is pressed. In this case, the light decoupling surface of the light-emitting diode chip and the light input surface of the optical element are then wetted with the sealing material.

In any case, a material is arranged between the light decoupling surface of the light-emitting diode chip and the light input surface of the associated optical element so that at least a major portion of the electromagnetic radiation emitted by the light-emitting diode chip does not pass through a material with a refraction index less than 1.3 before the radiation enters the light input surface in the optical element.

It is especially preferred for the refraction index of the material to correspond approximately to the refraction index of the material of which the optical element is made. Approximately means that the refraction index of the material deviates plus/minus ten percent from the refraction index of the material of which the optical element is made. The refraction index of the material preferably deviates by a maximum of plus/minus five percent, especially preferably by a maximum of two percent from the refraction index of the material of which the optical element is made.

According to at least one embodiment of the optical projection device, the light decoupling surface of at least one light-emitting diode chip, not adapted to the refraction index, is optically connected with the light input surface of the optical element associated with the light-emitting diode chip. That is to say that for this light-emitting diode chip, none of the precautions described above for adapting the refraction index between the light decoupling surface of the light-emitting diode chip and the light input surface of the associated optical element are taken.

Thus, when passing through the light input surface of the optical element, light emitted from the light-emitting diode chip thus passes from the optically thinner medium into the optically denser medium, for example. It is therefore possible that part of the light on the light input surface of the optical element is completely reflected and cannot enter the optical element. There can be, for example, a gap between the light decoupling surface of the light-emitting diode chip and the light input surface of the associated optical element, which is filled in with a material whose refraction index is less than 1.3. This gap is then preferably filled in with air.

According to at least one embodiment of the optical projection device, the optical projection device exhibits light-emitting diode chips of a first color. Light-emitting diode chips of a color means that these light-emitting diode chips—at least within the production tolerance—emit light of that color during operation. That is to say, for example, that the light-emitting diode chips are made essentially identical within the production tolerance.

According to at least one embodiment, the optical projection device further exhibits light-emitting diode chips of a second color, which is different from the first color. For example, the first color can be blue or red while the second color can then be green, for example. According to at least one embodiment of the optical projection device, the majority of the light-emitting diode chips of the first color, adapted to the refraction index, is optically connected with the light input surface of the associated optical element. The majority means that at least 50 percent of the light-emitting diode chips of the first color, adapted to the refraction index, are optically connected to the light input surface of the associated optical element. All light-emitting diode chips of the first color, adapted to the refraction index, are preferably optically connected with the light input surface of the associated optical element.

According to at least one embodiment of the optical projection device, the majority of the light-emitting diode chips of the second color, not adapted to the refraction index, is optically connected with the light input surface of the associated optical element. All light-emitting diode chips of the second color, not adapted to the refraction index, are preferably optically connected with the light input surface of the optical element associated with the light-emitting diode chip.

According to at least one embodiment of the optical projection device, the optical projection device exhibits at least one green light-emitting diode chip, all green light-emitting diode chips of the optical projection device, not adapted to the refraction index, being optically connected with the light input surface of the optical element associated with the light-emitting diode chip.

According to at least one embodiment of the optical projection device, the optical projection device exhibits at least one blue light-emitting diode chip, all blue light-emitting diode chips of the optical projection device, adapted to the refraction index, being optically connected with the light input surface of the optical element associated with the light-emitting diode chip.

According to at least one embodiment of the optical projection device, the optical projection device exhibits at least one red light-emitting diode chip, all red light-emitting diode chips of the optical projection device, adapted to the refraction index, being optically connected with the light input surface of the optical element associated with the light-emitting diode chip.

According to at least one embodiment of the optical projection device, the optical projection device comprises green, blue and red light-emitting diode chips. All green light-emitting diode chips, not adapted to the refraction index, are preferably optically connected with the associated optical element. All blue and all red light-emitting diode chips of the optical projection device, adapted to the refraction index, are preferably connected with the optical projection device.

The ratio of green light-emitting diode chips to blue light-emitting diode chips is preferably around 2:1. This means that the optical projection device contains about double the number of green light-emitting diode chips as blue. "Around 2:1" means that the number of green light-emitting diode chips deviates by no more than +/−10% from double the number of blue light-emitting diode chips.

The ratio of green light-emitting diode chips to red light-emitting diode chips in this embodiment is preferably around 2:1. This means that the optical projection device contains about double the number of green light-emitting diode chips as red. "Around 2:1" means that the number of green light-emitting diode chips deviates by no more than +/−10% from double the number of red light-emitting diode chips.

The ratio of green light-emitting diode chips to red light-emitting diode chips in this embodiment is especially preferred to be around 3:1. This means that the optical projection device contains about three times the number of green light-emitting diode chips as red. "Around 2:1" means that the number of green light-emitting diode chips deviates by no more than +/−10% from triple the number of red light-emitting diode chips.

Surprisingly, it has been shown that to achieve a typical white point using the projection device, a lower number of red and/or blue light-emitting diode chips is sufficient compared to the number of green light-emitting diode chips if the red and/or blue light-emitting diode chips are connected with the associated optical element adapted to the refraction index and at the same time the green light-emitting diode chips are connected with the associated optical element not adapted to the refraction index.

According to at least one embodiment of the optical projection device, the light decoupling surface of at least one light-emitting diode chip is essentially parallel with the active layer sequence of the light-emitting diode chip.

The active layer sequence of the light-emitting diode chip is suitable for the generation of light of a specific color. Preferably at least 90 percent of the electromagnetic radiation leaving the light-emitting diode chip exits the light-emitting diode chip through the light decoupling surface. For example, a light-emitting diode chip in thin-film construction, in which a growth substrate is thinned or removed, is especially well suited as a light-emitting diode chip of the optical projection device.

It is particularly preferred that all light-emitting diode chips in the optical projection device be formed as thin-film light-emitting diode chips.

Optical projection devices described here are explained in greater detail below using exemplary embodiments and the associated figures.

BRIEF DESCRIPTION OF THE DRAWINGS

FIG. 2 shows a schematic cross section diagram of an optical projection device described here according to the first exemplary embodiment.

FIG. 3 shows a schematic cross section diagram of an optical projection device described here according to a second exemplary embodiment.

FIG. 4 shows a schematic cross section diagram of an optical projection device described here according to a third exemplary embodiment.

In the exemplary embodiments and figures, components that are the same or have the same function are provided with the same reference numbers. The elements shown are not drawn to scale, rather individual elements may be depicted disproportionately large for better understanding.

DETAILED DESCRIPTION

Figure 1A:
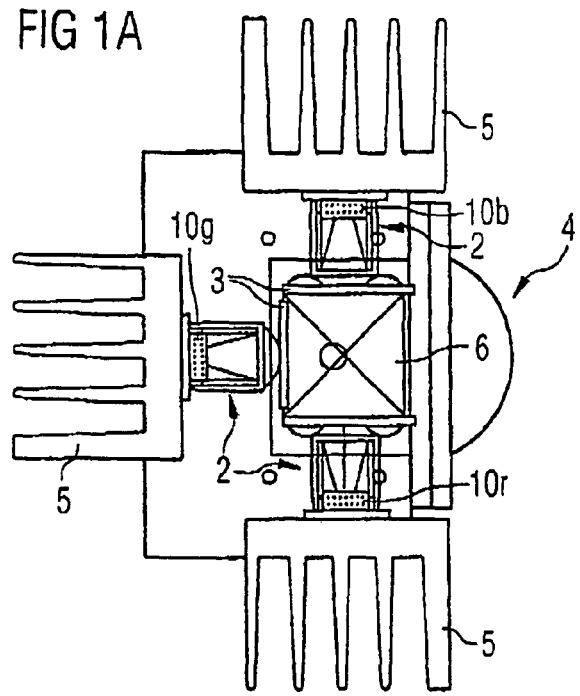
FIG. 1A shows a schematic diagram of an optical projection device described here according to a first exemplary embodiment.

FIG. 1A shows a schematic diagram of an optical projection device described here according to a first exemplary embodiment.

The optical projection device comprises three light sources 10g, 10b and 10r. Light source 10g is suitable for emitting green light during operation. Light source 10b is suitable for emitting blue light during operation. Light source 10r is suitable for emitting red light during operation.

Figure 1B:
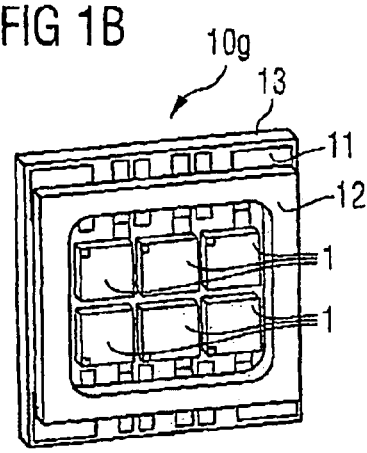
FIG. 1B shows a schematic perspective diagram of a light source for the optical projection device according to the first exemplary embodiment.

FIG. 1B shows a schematic perspective diagram of light source 10g, for example. Light source 10g comprises six light-emitting diode chips 1. The light-emitting diode chips 1 are green light-emitting diode chips, thus suitable for emitting light of a green color during operation. The light-emitting diode chips 1 are arranged on a connecting substrate 13, which comprises, for example, a base body of a ceramic material. The connecting substrate 13 further exhibits conductors 11, which are applied to the base body in a structured manner. The light-emitting diode chips 1 are surrounded by a frame 12, which is also made of a ceramic material, for example.

The light sources 10r and 10b are preferably constructed similarly to the light source 10g. The light sources essentially differ from one another by their light-emitting diode chips 1. Light source 10b comprises light-emitting diode chips 1, which are suitable for emitting light of a blue color during operation, thus blue light-emitting diode chips. Light source 10r comprises light-emitting diode chips 1, which are suitable for emitting light of a red color during operation, thus red light-emitting diode chips. Furthermore, the light sources 10g, 10b and 10r can differ from one another in the size and number of light-emitting diode chips.

Figure 1C:
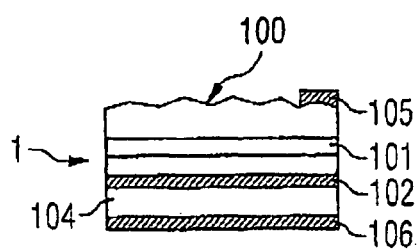
FIG. 1C shows a schematic cross section diagram of a light-emitting diode chip for the optical projection device according to the first exemplary embodiment.

FIG. 1C shows a schematic cross section of a light-emitting diode chip 1 as is preferably used in light sources 10g, 10b and 10r.

The light-emitting diode chip 1 exhibits a light decoupling surface 100, which can be roughened or structured, for example. The light decoupling surface 100 can be covered with a thin sealing compound, which can contain silicone and/or epoxy resin, for example.

A bond pad 105 is applied to the light decoupling surface 100, which enables an n-sided contact with the light-emitting diode chip 1, for example. The light decoupling surface 100 is preferably essentially parallel to the active layer sequence 101 which is suitable for generating the radiation. The light-emitting diode chip 1 further comprises at least one reflecting layer sequence 102, which can be formed by a metallic mirror. With its top side facing away from the original growth substrate, the epitactically grown layers of the light-emitting diode chip 1 are affixed to a substrate 104. A contact layer 106 enables a p-sided contact with the light-emitting diode chip 1, for example.

A major portion of the electromagnetic radiation generated in the light-emitting diode chip 1 preferably leaves it through the light decoupling surface 100. It is particularly preferred that at least 90 percent of the total electromagnetic radiation leaving the light-emitting diode chip 1 does so through the light decoupling surface 100. That is to say that very little or no electromagnetic radiation is emitted by through chip flanks of the light-emitting diode chip 1. A light-emitting diode chip produced using thin-film technology is especially well suited. That is to say that that growth substrate for the active layer sequence 101 of the light-emitting diode chip can be thinned or removed. The active layer sequence 101 can, for example, be applied to the substrate 104 with its surface facing away from original growth substrate. Light-emitting diode chips of thin-film construction are described, for example, in the publications WO 02/13281 A1 and EP 0 905 797 A2, the disclosed content of which, with regard to the thin-film construction of light-emitting diode chips, is hereby expressly incorporated by reference.

The light sources 10g, 10b and 10r are each respectively subordinate to optical elements 2. That is to say that these optical elements 2 are associated with the light-emitting diode chips 1 of the light sources 10g, 10b and 10r.

Figure 1D:
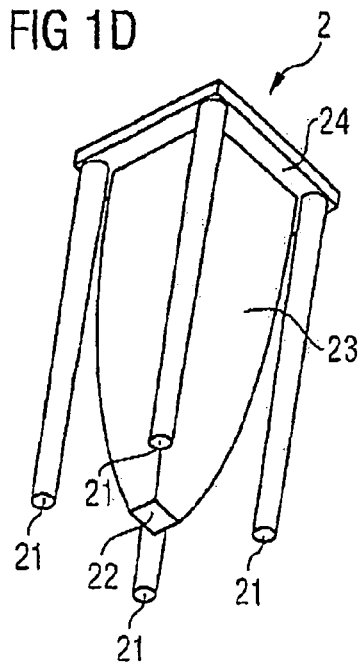
FIG. 1D shows a schematic perspective diagram of an optical element as can be used in a first exemplary embodiment of the optical projection device.

FIG. 1D shows a schematic perspective diagram of a possible embodiment of such an optical element 2. The optical element 2 exhibits a light input surface 22, through which the light emitted by the light-emitting diode chip 1 enters the optical element. The optical element comprises an optical body 23, which is preferably formed as a solid body. The optical body 23 consists, for example, of a transparent plastic. The optical body 23 tapers in the direction of the light input surface 22 and is formed, for example, in the shape of a truncated cone or a truncated pyramid. Furthermore, the optical body 23 can at least in places be formed according to the type of one of the following optical base elements: Compound Parabolic Concentrator (CPC), Compound Hyperbolic Concentrator (CHC), Compound Elliptic Concentrator (CEC).

The optical element further exhibits fixing pins 21, by which means the optical element can be affixed to a substrate. A retainer 24, which can be formed in one piece with the optical body 23, joins the optical body 23 with the fixing pins 21.

The light sources 10g, 10b and 10r are each joined in a heat conducting manner with a cooling body 5.

An imaging element 3—preferably an LCD panel 3—is subordinate to each optical element 2. The light emitted by the light sources 10g, 10b and 10r during operation enters a dichroitic beam splitter 6 (x-cube) through the LCD panel 3. From there, the light is projected onto a projection surface—such as a projection screen, for example—by means of projection optics 4. In the optical projection device described here, however, a sequential depiction of the primary colors is also possible.

FIG. 2 shows a schematic cross section diagram of an optical projection device described here according to the first exemplary embodiment. The light-emitting diode chips 1 of all three light sources 10g, 10b and 10r, adapted to the refraction index, are connected by means of a material 7 with the light input surface 22 of the associated optical element. The material 7 has a refraction index of 1.5, for example. The material 7 can be, for example, an index-matching gel or an optical adhesive.

For an LCD panel 3 with a diagonal of 0.55 inches and an acceptance angle of plus/minus 17 degrees, with four green, four blue and four red light-emitting diode chips 1 in this exemplary embodiment, a luminous flux of approximately four lumens per light-emitting diode chip 1 is generated.

With respect to an optical connection, not adapted to the refraction index, between all light-emitting diode chips 1 and the optical element, the luminous flux for red light-emitting diodes is approximately 1.9 times greater. The luminous flux for green and blue light-emitting diode chips is approximately 1.5 times greater. The étendue increases by about 225 percent because of the adaptation of the refraction index.

For an LCD panel 3 with a diagonal of 0.7 inches and an acceptance angle of +/−17 degrees, the luminous flux with six green, six blue and six red light-emitting diode chips 1 in this exemplary embodiment is 4.4 lumens per light-emitting diode chip.

On the other hand, for an LCD panel 3 with a diagonal of 0.7 inches and an acceptance angle of +/−17 degrees, the luminous flux with 12 green, 12 blue and 12 red light-emitting diode chips is 3.2 lumens per light-emitting diode chip when each of the light-emitting diode chips 1 is connected, not adapted to the refraction index, with the associated optical element.

For an LCD panel 3 with a diagonal of 1.0 inches and an acceptance angle of +/−17 degrees, the luminous flux with 12 green, 12 blue and 12 red light-emitting diode chips 1 in this exemplary embodiment is 4.4 lumens per light-emitting diode chip.

On the other hand, for an LCD panel 3 with a diagonal of 1.0 inches and an acceptance angle of +/−17 degrees, the luminous flux with 24 green, 24 blue and 24 red light-emitting diode chips is 3.1 lumens per light-emitting diode chip when each of the light-emitting diode chips 1 is connected, not adapted to the refraction index, with the associated optical element.

For an LCD panel 3 with a diagonal of 1.3 inches and an acceptance angle of +/−17 degrees, the luminous flux with 20 green, 20 blue and 20 red light-emitting diode chips 1 in this exemplary embodiment is 4.4 lumens per light-emitting diode chip.

On the other hand, for an LCD panel 3 with a diagonal of 1.3 inches and an acceptance angle of +/−17 degrees, the luminous flux with 42 green, 42 blue and 42 red light-emitting diode chips is 3.4 lumens per light-emitting diode chip when each of the light-emitting diode chips 1 is connected, not adapted to the refraction index, with the associated optical element.

For an LCD panel 3 with a diagonal of 1.8 inches and an acceptance angle of +/−17 degrees, the luminous flux with 20 green, 20 blue and 20 red light-emitting diode chips 1 in this exemplary embodiment is 8.5 lumens per light-emitting diode chip.

On the other hand, for an LCD panel 3 with a diagonal of 1.8 inches and an acceptance angle of +/−17 degrees, the luminous flux with 42 green, 42 blue and 42 red light-emitting diode chips is 5.9 lumens per light-emitting diode chip when each of the light-emitting diode chips 1 is connected, not adapted to the refraction index, with the associated optical element.

FIG. 3 shows a schematic cross section diagram of an optical projection device described here according to a second exemplary embodiment. In contrast to the exemplary embodiment shown in FIGS. 1 and 2, the green light-emitting diode chips, not adapted to the refraction index, are optically connected with the light input surface of the associated optical element 2. Between the light decoupling surface 100 of the green light-emitting diode chips 1 and the light input surface 22 of the associated optical element 2, there is an air gap 8. The red and blue light-emitting diode chips 1 are, as in the previous exemplary embodiment, connected, adapted to the refraction index, with the respective associated optical element 2. Surprisingly, it has been shown that if the refraction index adaptation is eliminated for the green light-emitting diode chips, the total number of light-emitting diode chips can be reduced with the same luminous flux, or that the luminous flux can be increased with the same number of light-emitting diode chips, a typical white point display being achieved at the same time.

For an LCD panel 3 with a diagonal of 0.55 inches and an acceptance angle of plus/minus 17 degrees, with six green, four blue and four red light-emitting diode chips, a luminous flux of 4.4 lumens per chip is generated.

For an LCD panel 3 with a diagonal of 0.7 inches and an acceptance angle of +/−17 degrees, the luminous flux with 12 green, six blue and six red light-emitting diode chips 1 in this exemplary embodiment is 4.9 lumens per light-emitting diode chip.

For an LCD panel 3 with a diagonal of 1.0 inches and an acceptance angle of +/−17 degrees, the luminous flux with 24 green, 12 blue and 12 red light-emitting diode chips 1 in this exemplary embodiment is 4.7 lumens per light-emitting diode chip.

For an LCD panel 3 with a diagonal of 1.3 inches and an acceptance angle of +/−17 degrees, the luminous flux with 42 green, 20 blue and 20 red light-emitting diode chips 1 in this exemplary embodiment is 5.3 lumens per light-emitting diode chip.

For an LCD panel 3 with a diagonal of 1.8 inches and an acceptance angle of +/−17 degrees, the luminous flux with 42 green, 20 blue and 20 red light-emitting diode chips 1 in this exemplary embodiment is 9.1 lumens per light-emitting diode chip.

FIG. 4 shows a schematic cross section diagram of the optical projection device according to a third exemplary embodiment. In contrast to the previous exemplary embodiment, which was described in connection with FIG. 3, the number of red light-emitting diode chips is further reduced compared to the green and blue light-emitting diode chips.

For example, for an LCD panel 3 with a diagonal of 0.55 inches and an acceptance angle of plus/minus 17 degrees, with six green, four blue and two red light-emitting diode chips, a luminous flux of 5.2 lumens per chip is generated. This configuration, compared to a variant with four green, four blue and four red light-emitting diode chips 1, which are all optically connected, adapted to the refraction index, with the associated optical element 2, distinguishes itself by an approximately 30 percent greater luminous flux with the same number of chips.

For an LCD panel 3 with a diagonal of 0.7 inches and an acceptance angle of +/−17 degrees, the luminous flux with 12 green, six blue and three red light-emitting diode chips 1 in this exemplary embodiment is 5.6 lumens per light-emitting diode chip.

For an LCD panel 3 with a diagonal of 1.0 inches and an acceptance angle of+/−17 degrees, the luminous flux with 24 green, 12 blue and six red light-emitting diode chips in this exemplary embodiment is 5.4 lumens per light-emitting diode chip.

For an LCD panel 3 with a diagonal of 1.3 inches and an acceptance angle of +/−17 degrees, the luminous flux with 42 green, 20 blue and 10 red light-emitting diode chips 1 in this exemplary embodiment is 6.0 lumens per light-emitting diode chip.

For an LCD panel 3 with a diagonal of 1.8 inches and an acceptance angle of +/−17 degrees, the luminous flux with 42 green, 20 blue and 10 red light-emitting diode chips 1 in this exemplary embodiment is 10.3 lumens per light-emitting diode chip.

Overall, the optical projection device described here can be produced very cost-effectively because, among other things, the same luminous flux can be realized with a reduced number of light-emitting diode chips. The luminous flux is measured per light-emitting diode chip for the white point display.

The invention is not restricted by the description using the exemplary embodiments. Rather, the invention comprises each new characteristic as well as each combination of characteristics, which particularly includes each combination of characteristics in the patent claims, even if this characteristic or this combination itself is not explicitly specified in the patent claims or exemplary embodiments.

The invention claimed is:

1. An optical projection device comprising:
    a plurality of light-emitting diode chips including light-emitting diode chips of a first color; and light-emitting diode chips of a second color, which is different from the first color; and
    at least one optical element with a light input surface which is associated with at least one light-emitting diode chip, a light decoupling surface of the light-emitting diode chip being optically connected, adapted to a refraction index of the optical element, to the light input surface of the associated optical element;
    wherein a majority of the light-emitting diode chips of the first color each are optically connected, adapted to the refraction index, to the light input surface of an associated optical element;
    and wherein a majority of the light-emitting diode chips of the second color each are optically connected, not adapted to the refraction index, with the light input surface of an associated optical element.

2. The optical projection device of claim 1, in which a gap between the light decoupling surface of at least one light-emitting diode chip and the light input surface of the associated optical element is filled with at least one material whose refraction index is at least 1.3.

3. The optical projection device of claim 2, in which the refraction index of the at least one material whose refraction index is at least 1.3 corresponds approximately to the refraction index of material of which the associated optical element is made.

4. The optical projection device according of claim 1, in which a light decoupling surface of at least one of the light-emitting diode chips is optically connected, not adapted to the refraction index of an optical element, with a light input surface of the optical element associated with the light-emitting diode chip that is not adapted to the refraction index of the optical element.

5. The optical projection device of claim 4, in which a gap between the light decoupling surface of the light-emitting diode chip that is not adapted to the refraction index of the optical element and the light input surface of the associated optical element (2) is filled with a material whose refraction index is less than 1.3.

6. The optical projection device of claim 5 in which the gap contains air.

7. The optical projection device according to claim 1, with at least one green light-emitting diode chip, in which all green light-emitting diode chips of the optical projection device are optically connected, not adapted to the refraction index, with the light input surface of an associated optical element.

8. The optical projection device according to claim 1, with at least one blue light-emitting diode chip, in which all blue light-emitting diode chips of the optical projection device are optically connected, adapted to the refraction index, with the light input surface of an associated optical element.

9. The optical projection device according to claim 1, with at least one red light-emitting diode chip, in which all red light-emitting diode chips of the optical projection device are optically connected, adapted to the refraction index, with the light input surface of an associated optical element.

10. The optical projection device of claim 1, comprising:
    at least one green light-emitting diode chip,
    at least one blue light-emitting diode chip, and
    at least one red light-emitting diode chip,
    all green light-emitting diode chips being optically connected, not adapted to the refraction index, with the light input surface of an associated optical element,
    all blue light-emitting diode chips being optically connected, adapted to the refraction index, with the light input surface of an associated optical element, and
    all red light-emitting diode chips being optically connected, adapted to the refraction index, with a light input surface of an associated optical element,
    wherein the ratio of green light-emitting diode chips to blue light-emitting diode chips being approximately two to one and the ratio of green light-emitting diode chips to red light-emitting diode chips being approximately two to one.

11. The optical projection device of claim 1 comprising:
    at least one green light-emitting diode chip,
    at least one blue light-emitting diode chip, and
    at least one red light-emitting diode chip,
    all green light-emitting diode chips being optically connected, not adapted to the refraction index, with the light input surface of an associated optical element,
    all blue light-emitting diode chips being optically connected, with the light input surface of an associated optical element, and
    all red light-emitting diode chips being optically connected with a light input surface of an associated optical element,
    wherein the ratio of green light-emitting diode chips to blue light-emitting diode chips being approximately two to one and the ratio of green light-emitting diode chips to red light-emitting diode chips being approximately three to one.

12. The optical projection device claim 1, in which the light decoupling surface of at least one of the light-emitting diode chips is parallel to an active layer sequence of the light-emitting diode chip and at least ninety percent of the electromagnetic radiation leaving the light-emitting diode chip exits through the light decoupling surface.

13. An optical projection device comprising:
    a first light-emitting diode chip of a first color;
    a first optical element with a light input surface which is associated with the first light-emitting diode chip, a light decoupling surface of the first light-emitting diode chip being optically connected to the light input surface of the first optical element, wherein a gap between the light decoupling surface of the first light-emitting diode chip and the light input surface of the first optical element is filled with at least one material whose refraction index is at least 1.3;
    a second light-emitting diode chip of a second color wherein the second color is different to the first color; and a second optical element with a light input surface which is associated with the second light-emitting diode chip, a light decoupling surface of the second light-emitting diode chip being optically connected to the light input surface of the second optical element, wherein a gap between the light decoupling surface of the second light-emitting diode chip and the light input surface of the second optical element is filled with at least one material whose refraction index is less than 1.3.

14. The optical projection device of claim 13, in which the refraction index of the at least one material whose refraction index is at least 1.3 corresponds approximately to the refraction index of material of which the first optical element is made.

15. The optical projection device of claim 14 in which the gap between the light decoupling surface of the second light-emitting diode chip and the light input surface of the second optical element contains air.

16. The optical projection device of claim 13, comprising:
a plurality of the first light-emitting diode chips, the first light-emitting diode chips emitting light of a first color; and
a plurality of the second light-emitting diode chips, the second light-emitting diode chips emitting light of a second color that is different than the first color;
wherein the plurality of first light-emitting diode chips each have a light decoupling surface optically connected to the light input surface of an associated first optical element, wherein, for each of a majority of the plurality of first light-emitting diode chips, a gap between the light decoupling surface of the first light-emitting diode chip and the light input surface of the associated first optical element is filled with at least one material whose refraction index is at least 1.3; and
wherein the plurality of second light-emitting diode chips each have a light decoupling surface optically connected to the light input surface of an associated second optical element, wherein, for each of a majority of the plurality of second light-emitting diode chips, a gap between the light decoupling surface of the second light-emitting diode chip and the light input surface of the associated second optical element is filled with at least one material whose refraction index is less than 1.3.

17. The optical projection device according to claim 16, with at least one green light-emitting diode chip, in which all green light-emitting diode chips of the optical projection device are optically connected with the light input surface of an associated optical element by gaps between the light decoupling surface of the green light-emitting diode chips and the light input surface of the associated optical elements filled with at least one material whose refraction index is less than 1.3.

18. The optical projection device according to claim 16, with at least one blue or red light-emitting diode chip, in which all blue and red light-emitting diode chips of the optical projection device are optically connected with the light input surface of an associated optical element by gaps between the light decoupling surface of the blue and red light-emitting diode chips and the light input surface of the associated optical elements filled with at least one material whose refraction index is at least 1.3.

19. The optical projection device of claim 16, comprising:
at least one green light-emitting diode chip,
at least one blue light-emitting diode chip, and
at least one red light-emitting diode chip,
wherein all green light-emitting diode chips of the optical projection device are optically connected with the light input surface of an associated optical element by gaps between the light decoupling surface of the green light-emitting diode chips and the light input surface of the associated optical elements filled with at least one material whose refraction index is less than 1.3;
wherein all blue light-emitting diode chips of the optical projection device are optically connected with the light input surface of an associated optical element by gaps between the light decoupling surface of the blue light-emitting diode chips and the light input surface of the associated optical elements filled with at least one material whose refraction index is at least 1.3.
wherein all red light-emitting diode chips of the optical projection device are optically connected with the light input surface of an associated optical element by gaps between the light decoupling surface of the red light-emitting diode chips and the light input surface of the associated optical elements filled with at least one material whose refraction index is at least 1.3; and
wherein the ratio of green light-emitting diode chips to blue light-emitting diode chips being approximately two to one and the ratio of green light-emitting diode chips to red light-emitting diode chips being approximately two to one.

* * * * *

UNITED STATES PATENT AND TRADEMARK OFFICE
CERTIFICATE OF CORRECTION

| | | |
|---|---|---|
| PATENT NO. | : 7,976,200 B2 | Page 1 of 1 |
| APPLICATION NO. | : 12/279873 | |
| DATED | : July 12, 2011 | |
| INVENTOR(S) | : Stefan Grötsch | |

It is certified that error appears in the above-identified patent and that said Letters Patent is hereby corrected as shown below:

On the title page, item (56) References Cited, U.S. PATENT DOCUMENTS, line 12, delete "2002/0017562 and insert -- 2002/0017652 --.

Column 10, line 48, Claim 12, after "device" insert -- of --.

Column 12, line 33, Claim 19, delete "1.3." and insert -- 1.3; --.

Signed and Sealed this
Eighteenth Day of October, 2011

David J. Kappos
*Director of the United States Patent and Trademark Office*